(12) United States Patent
Chi et al.

(10) Patent No.: US 7,155,089 B1
(45) Date of Patent: Dec. 26, 2006

(54) WIDE-BAND FIBER-OPTIC TUNABLE FILTER

(75) Inventors: Sien Chi, Hsin-Chu (TW); Nan-Kuang Chen, Taipei Hsien (TW); Shiao-Min Tseng, Hsin-Chu (TW)

(73) Assignee: National Chiao Tung University, Hsin-Chu (TW)

( * ) Notice: Subject to any disclaimer, the term of this patent is extended or adjusted under 35 U.S.C. 154(b) by 0 days.

(21) Appl. No.: 11/184,582

(22) Filed: Jul. 19, 2005

(51) Int. Cl.
*G02B 6/26* (2006.01)
*H01P 1/20* (2006.01)

(52) U.S. Cl. ........................................ 385/30; 333/209
(58) Field of Classification Search ................... 385/30
See application file for complete search history.

(56) References Cited

U.S. PATENT DOCUMENTS

| | | | | |
|---|---|---|---|---|
| 4,869,567 | A * | 9/1989 | Millar et al. ................... | 385/27 |
| 5,809,188 | A * | 9/1998 | Tseng et al. ................... | 385/37 |
| 5,966,493 | A * | 10/1999 | Wagoner et al. ............. | 385/140 |
| 6,026,205 | A * | 2/2000 | McCallion et al. ........... | 385/30 |
| 6,052,220 | A * | 4/2000 | Lawrence et al. ....... | 359/341.1 |
| 6,744,948 | B1 * | 6/2004 | Pi et al. ........................ | 385/30 |
| 2004/0208449 | A1 * | 10/2004 | Chen et al. .................... | 385/39 |

OTHER PUBLICATIONS

Chen et al. "Wideband Tunable Fiber Short-Pass Filter Based On Side-Polished Fiber With Dispersive Polymer Overlay." Optics Letters. Oct. 1, 2004. vol. 29, No. 19. pp. 2219-2221.*
Chen et al. "A Widely Tunable Side-Polished Fiber Filter Based on Dispersive Evanescent Wave Tunnelling." Lasers and Electro-Optics Society, 2004. LEOS 2004. The 17th Annual Meeting of the IEEE. vol. 1, Nov. 7-11, 2004. pp. 302-303.*

* cited by examiner

*Primary Examiner*—John D. Lee
*Assistant Examiner*—Rhonda S. Peace
(74) *Attorney, Agent, or Firm*—Volpe and Koenig, P.C.

(57) ABSTRACT

A wide-band fiber-optic tunable filter is provided. Dispersive polymers with different dispersion characteristics and side-polished fibers are used to fabricate wide-band tunable band-pass filters, band-rejection filters, short-wavelength-pass filters or long-wavelength-pass filters. This kind of wide-band fiber-optic tunable fiber filters is able to be used in the applications of fiber-to-the-home (FTTH) system networks. It is also able to be used in the applications of sensitive temperature sensors, high-resolution fiber refractometers, gain-flattened filters, fiber modal filters and fiber mode-field expanders/condensers.

19 Claims, 10 Drawing Sheets

WIDE-BAND FIBER-OPTIC TUNABLE FILTER

FIELD OF THE INVENTION

The present invention relates to a fiber-optic filter, especially to a wide-band fiber-optic tunable filter in the application of the fiber-to-the-home (FTTH) network of Tri-band system.

BACKGROUND OF THE INVENTION

Presently, various methods are developed for fabricating the fiber-optic filter. For example, in the case of U.S. Pat. No. 6,636,684B1, which is entitled "Dispersive Optical Fiber Using Binary Component Slica", cores and claddings of fibers with different material dispersions are utilized to fabricate a fiber-optic filter. Besides, in the case of U.S. Pat. No. 5,673,342, which is entitled "Communication System Comprising A Low Cost Optical Filter", a core and a depressed cladding of a fiber is utilized to fabricate a waveguide dispersion. However, these methods both need specialized kinds of fibers, which cost much and have high optical losses.

Regarding the academic research, moreover, many efforts are also done for improving the fabrication of the fiber-optic filter. For example, in the disclosure of K. McCallion, W. Johnstone, and G. Fawcett, "Tunable in-line fiber-optic bandpass filter," Opt. Lett. 19, 542–544 (1994)", an optic film which is positioned on the side-polished fiber is utilized to fabricate a fiber-optic band-pass filter. Besides, in the disclosure of G. Raizada and B. P. Pal, "Refractometers and tunable components based on side-polished fibers with multimode overlay waveguides: role of the superstrate," Opt. Lett. 21, 399–401 (1996)", a similar method is also utilized to fabricate a fiber-liquid-refractive-index meter. The fiber-optic band-pass filter as well as the fiber-liquid-refractive-index meter fabricated by the mentioned methods, however, both have a poor accuracy and need to be further improved.

In the disclosure of M. Tammer, R. W. T. Higgins, and A. P. Monkman, "High optical anisotropy in thin film of polyfluorene and its affect on the outcoupling of light in typical polymer light emitting diode structures," J. Appl. Phys. 91, 4010–4013 (2002)", a conjugated polymer having a high dispersive characteristic around a light-high-absorbed location is disclosed. A polymer with a sharper slope of the refractive index dispersive curve than that of the fiber is able to be utilized to fabricate a long-wavelength-pass filter. On the contrary, a polymer with a flatter slope of the refractive index dispersive curve than that of the fiber is able to be utilized to fabricate a short-wavelength-pass filter. Besides, the long-wavelength-pass filter and the short-wavelength-pass filter can be concatenated to fabricate a band-pass filter. Certainly, other polymers with a specialized shape of dispersive curves are also utilized to fabricate a band-pass filter or a band-rejection or notch filter.

In the disclosure of H. R. Stuart, "Dispersive multiplexing in multimode optical fiber," Science 289, 281–283 (2000)", several spatial modes of a multi-modes fiber is developed for being used in the application of signal multiplexing. Hence, a fiber-mode filter is achievable by the elements with multi-modes fibers, since the effective refractive indices of different transmission modes thereof fibers are respectively different.

In the disclosure of Y. Miyamori, Y. Ashi, E. Sato, and M. Takano, "PON-based all fiber-optic access system," Hitachi Review 47, 63–66 (1998)", it is mentioned that the traditional bi-directional techniques (1310/1550-nm) is replaced by the Tri-band techniques (1310/1490/1550-nm) in the WDM-PON network with FTTH systems in Japan.

Besides, in the attached several disclosures, the aforementioned dispersive fibers and the applications thereof for fabricating filters are also mentioned. However, such schemes are disadvantageous in the high costs because of the adoption of the specialized fibers, and hence the schemes are hard to be popularized.

The following disclosures are cited as the references for the present invention.

[1] J. W. Yu and K. Oh, "New in-line fiber band pass filters using high silica dispersive optical fibres," Opt. Commun. 204, 111–118 (2002).

[2] K. Morishita, "Optical fiber devices using dispersive materials," J. Lightwave Technol. 7, 198–201 (1989).

[3] K. Morishita, "Bandpass and band-rejection filters using dispersive fibers," J. Lightwave Technol. 7, 816–819 (1989).

[4] K. Morishita, M. S. Yataki, and W. A. Gambling, "In-line optical fibre filters using dispersive materials," Electron. Lett. 23, 319–321 (1987).

[5] J. Nishimura, Y. Ueda, and K. Morishita, "Fabrication of dispersive fibers and their application to long wavelength-pass filters," Electronics and Communications in Japan, 79, 9–15 (1996).

[6] K. Morishita and S. Yutani, "Wavelength-insensitive couplers made of annealed dispersive fibers," J. Lightwave Technol. 17, 2356–2360 (1999).

[7] J. Nishimura and K. Morishita, "Mode-field expansion and reduction in dispersive fibers by local heat treatments," J. Select. Topics Quantum Electron. 5, 1260–1265 (1999).

SUMMARY OF THE INVENTION

Hence, for overcoming the mentioned drawbacks in the prior art, the present invention provides a wide-band fiber-optic tunable filter. In the present invention, polymers with different dispersive factors and fiber-optic elements with respective evanescent-fields are combined to fabricate fiber-optic tunable short-pass filters, long-pass filters and band-pass filters. These filters are usable in the application of the last mile implement of the fiber-to-the-home (FTTH) system networks. Besides, they also can be used in the applications of sensitive temperature sensors, fiber refractometers, gain-flattened filters, fiber modal filters and fiber mode-field expanders/condensers.

According to one aspect of the present invention, a fabricating method of a wide-band fiber-optic tunable filter is provided. In comparison with the traditional fabricating method of the fiber-optic tunable filter, the present invention just adopts normal fibers rather than expensive specialized fibers to fabricate the fiber-optic tunable filters. The fiber-optic tunable filter provided by the present invention is advantageous in a low optic loss, a wide-band tunability, a high extinction ratio, a high sensitivity and a small size. Such a fiber-optic tunable filter is fabricated by positioning optical polymers on the evanescent-field region of a polished fiber. The volume of the packed filter is about equal to the size of a steel cylinder, e.g. the length of 25 mm and the diameter of 2 mm, and the tunable range of the wavelength thereof is at least 400 nm, which is wide enough for covering all the bandwidth for the fiber-optic communication systems. Moreover, the cost of the previous fiber0optic tunable filter is efficiently decreased, and hence the fiber-optic tunable filter of this invention is suitable for the fiber-to-the-home (FTTH) system networks.

According to another aspect of the present invention, a fiber-optic tunable filter is provided. The provided fiber-optic tunable filter includes at least a fiber having a core and a cladding with an evanescent-field surface on one side thereof; and at least a dispersive material positioned on the evanescent-field surface and having a dispersive characteristic and a refractive index, wherein a light propagated in the core is leaky while passing through the evanescent-field surface according to a relationship between the dispersive characteristic and a change of the refractive index.

Preferably, the fiber-optic tunable filter is a band-pass filter.

Preferably, the fiber-optic tunable filter is a band-rejection filter.

Preferably, the fiber-optic tunable filter is a short-wavelength-pass filter.

Preferably, the fiber-optic tunable filter is a long-wavelength-pass filter.

Preferably, the band-pass filter includes a short-wavelength-pass filter and a long-wavelength-pass filter.

Preferably, the evanescent-field surface is fabricated by a polishing method.

Preferably, the evanescent-field surface is fabricated by a laser ablation method.

Preferably, the evanescent-field surface is fabricated by a heating and stretching method.

Preferably, the heating and stretching method is performed by a heat source being one selected from a group consisting of a fire, a heating wire, an electromagnetic wave and an electric arc.

Preferably, the fiber-optic tunable filter includes a substrate with a froove having the evanescent-field surface therein.

Preferably, the substrate is one of a silicon substrate and a quartz substrate.

Preferably, the fiber-optic tunable filter includes a heating element and a temperature sensor arranged on another side of the cladding.

Preferably, the heating element is one selected from a group consisting of a TE cooler, a heating wire and a superconductive heating material.

Preferably, the change of the refractive index is achieved by being applied with one of a heat source and an electric field.

Preferably, the dispersive material is an optical polymer.

Preferably, the dispersive material is interlaced multilayer made of different dispersive materials.

Preferably, the dispersive material has a birefringence property.

Preferably, the dispersive material has a photonic crystal band-gap structure.

Preferably, the fiber is a micro-structure fiber.

The foregoing and other features and advantages of the present invention will be more clearly understood through the following descriptions with reference to the drawings, wherein:

DETAILED DESCRIPTION OF THE PREFERRED EMBODIMENT

In the present invention, the theory of total internal refection (TIRF) is utilized. That is, the refractive index of a core of a fiber must be higher than that of a cladding of the fiber so that the signal light is able to be guided to propagate in the core. However, there are four situations with regard to the refractive indices of a core and a cladding of a fiber varying with the wavelength of the light, which are shown in FIG. 1 to FIG. 4, relating to the cases of a fiber-optic band-pass, a band-rejection, a short-pass and a long-pass filters respectively.

Instead of doping special constituents into the core and the cladding to fabricate dispersive fibers, the present invention takes steps therefor as follows. Please refer to FIG. 5. First, a normal fiber is arranged and fixed in a silicon V-groove 50 on a silicon substrate. The cladding 52 on the silicon substrate is then polished to show an evanescent-field 53. Different kinds of dispersive polymers 54 is positioned on the evanescent-field 53 and then fixed by spacers 55. A TE cooler 56 is further set upon the polymers 54.

Figure 1:
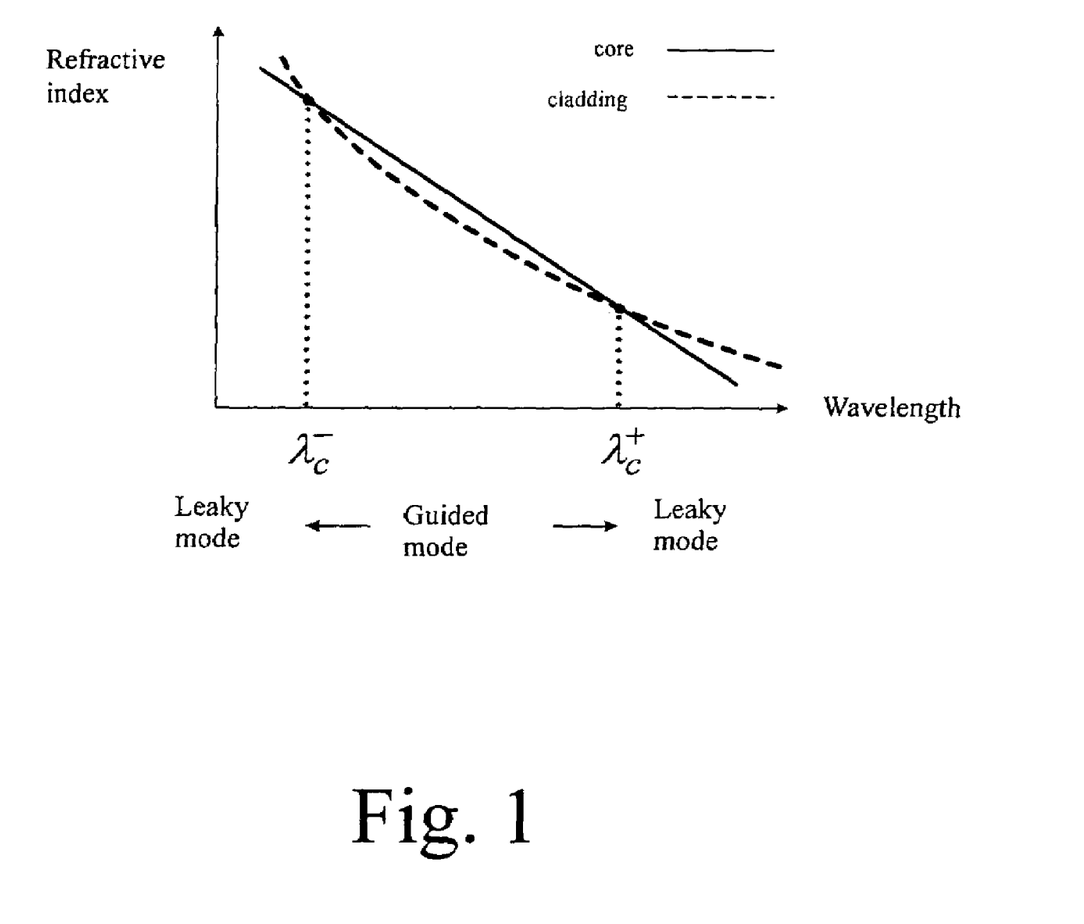
FIG. 1 is a schematic diagram showing the respective refractive index dispersion curves (refractive index vs. wavelength) of the core and the cladding of a filter, wherein the filter is a band-pass filter.
Figure 2:
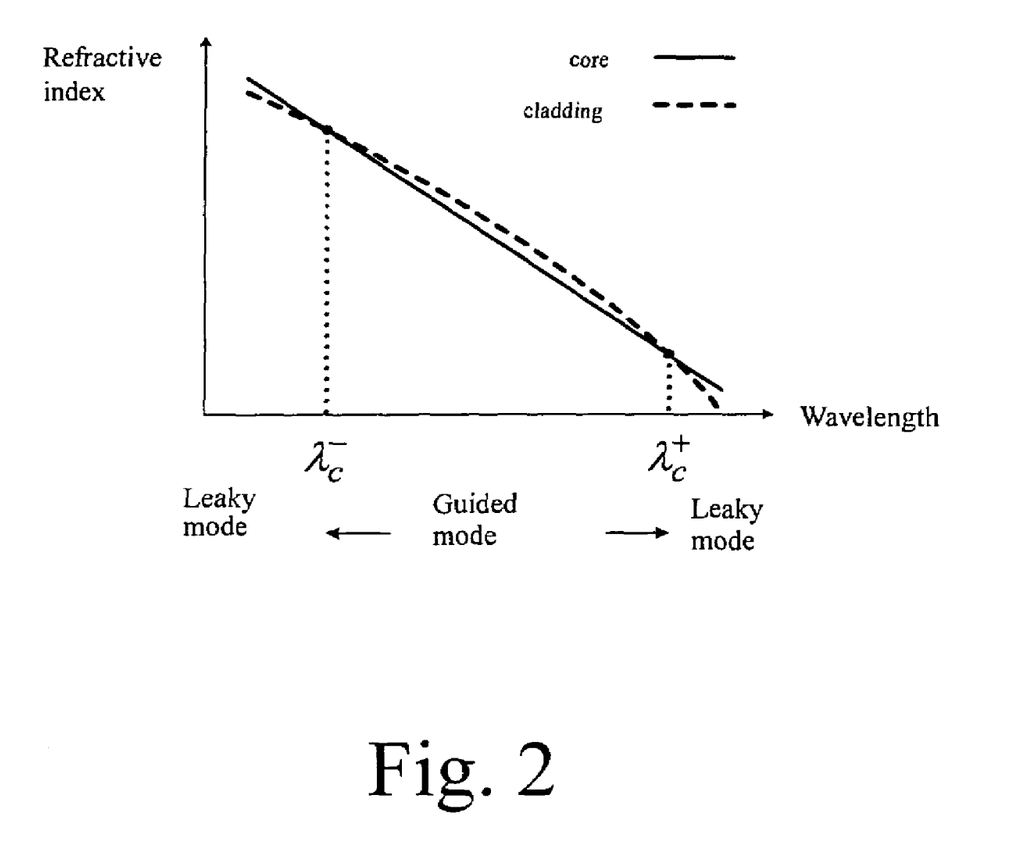
FIG. 2 is a schematic diagram showing the respective refractive index dispersion curves (refractive index vs. wavelength) of the core and the cladding of a filter, wherein the filter is a band-rejection filter.
Figure 3:
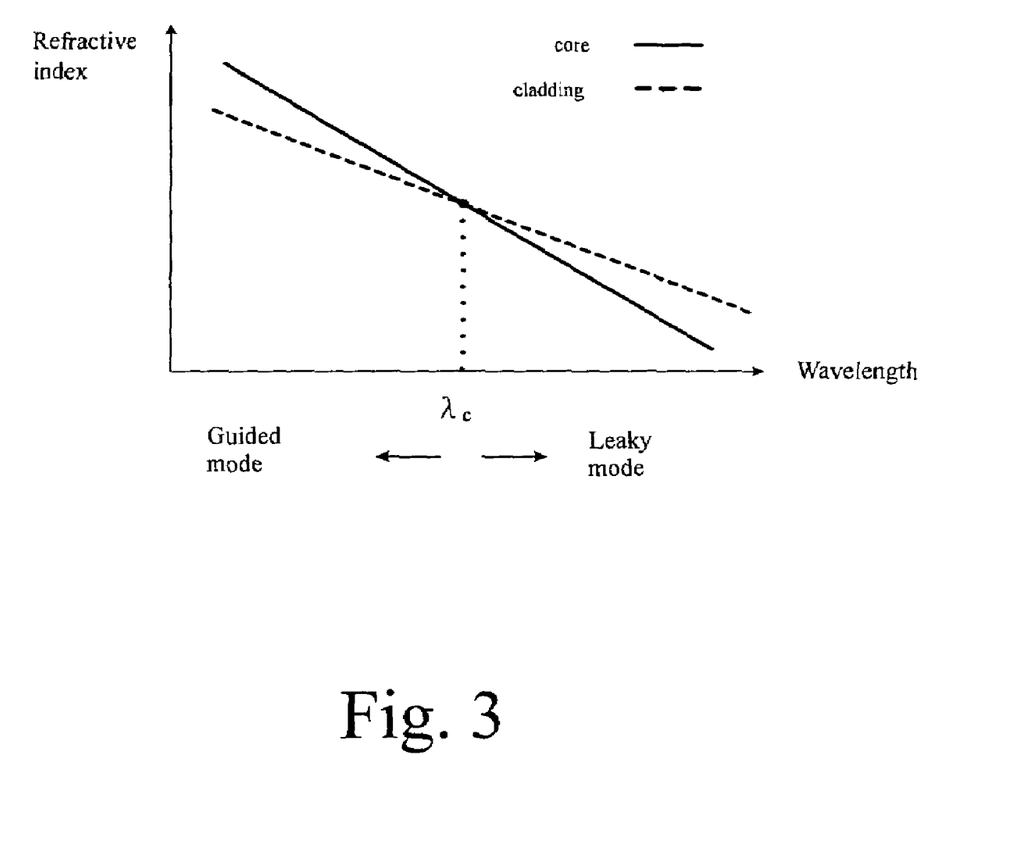
FIG. 3 is a schematic diagram showing the respective refractive index dispersion curves (refractive index vs. wavelength) of the core and the cladding, wherein the filter is a short-pass filter.
Figure 4:
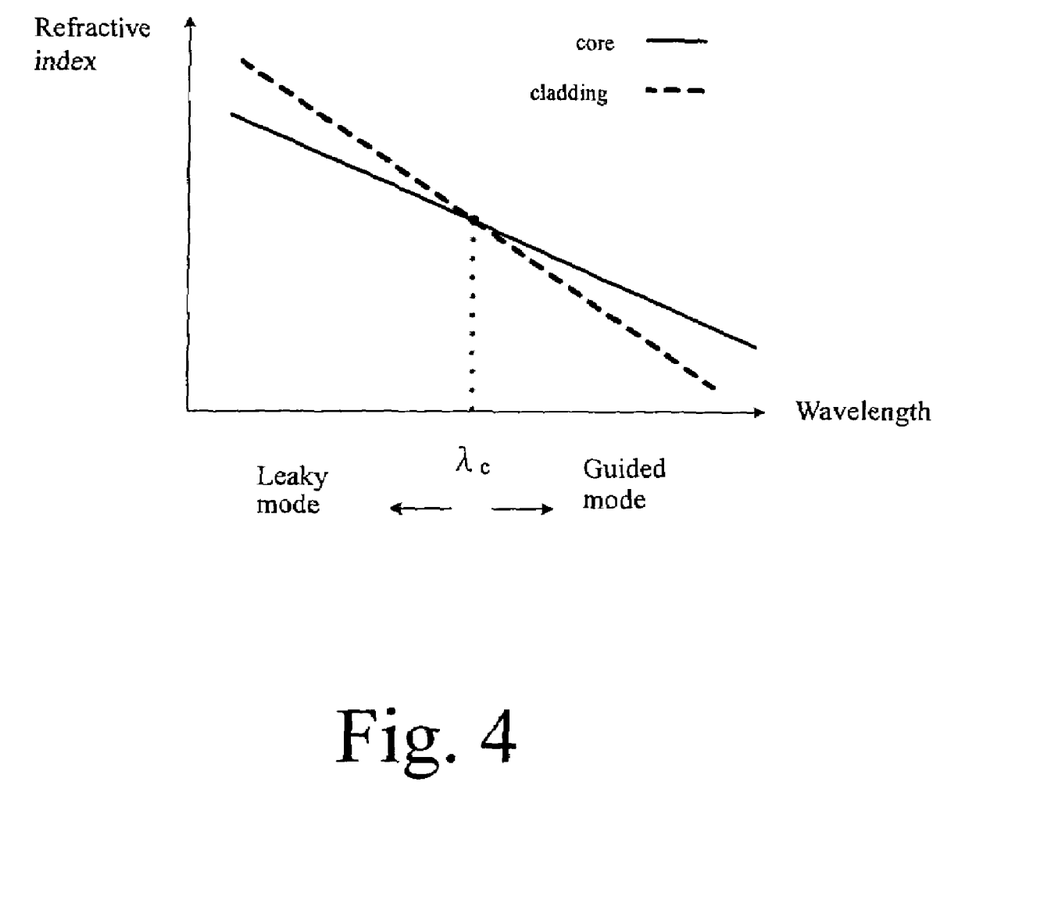
FIG. 4 is a diagram showing the change of the refractive index of a core and a cladding of a fiber varying according to the change of the wavelength of the light, wherein the filter is a long-pass filter.
Figure 5:
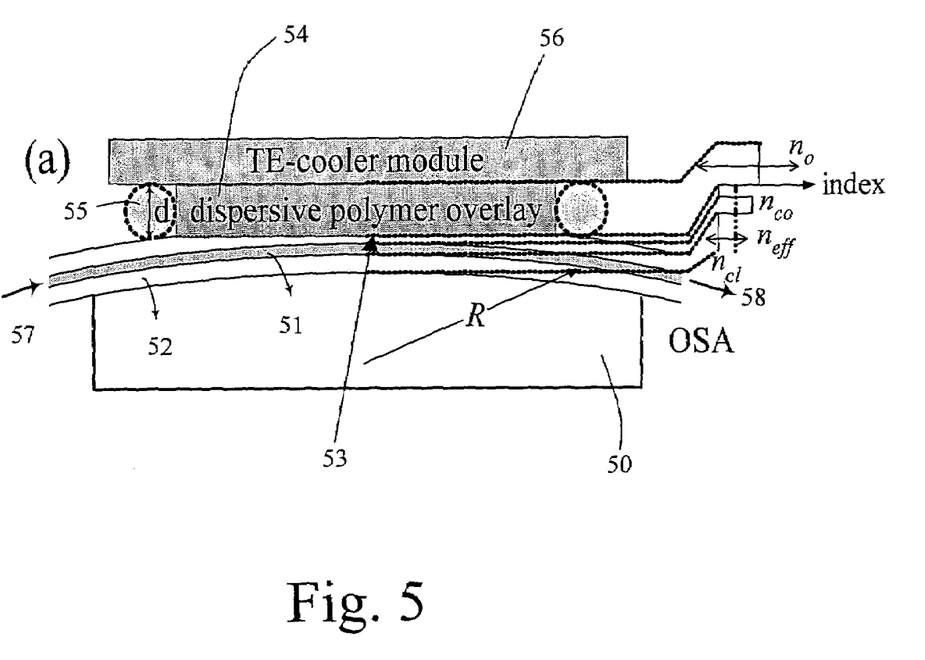
FIG. 5 is a side view schematically showing a fiber-optic tunable filter according to a first embodiment of the present invention.
Figure 6:
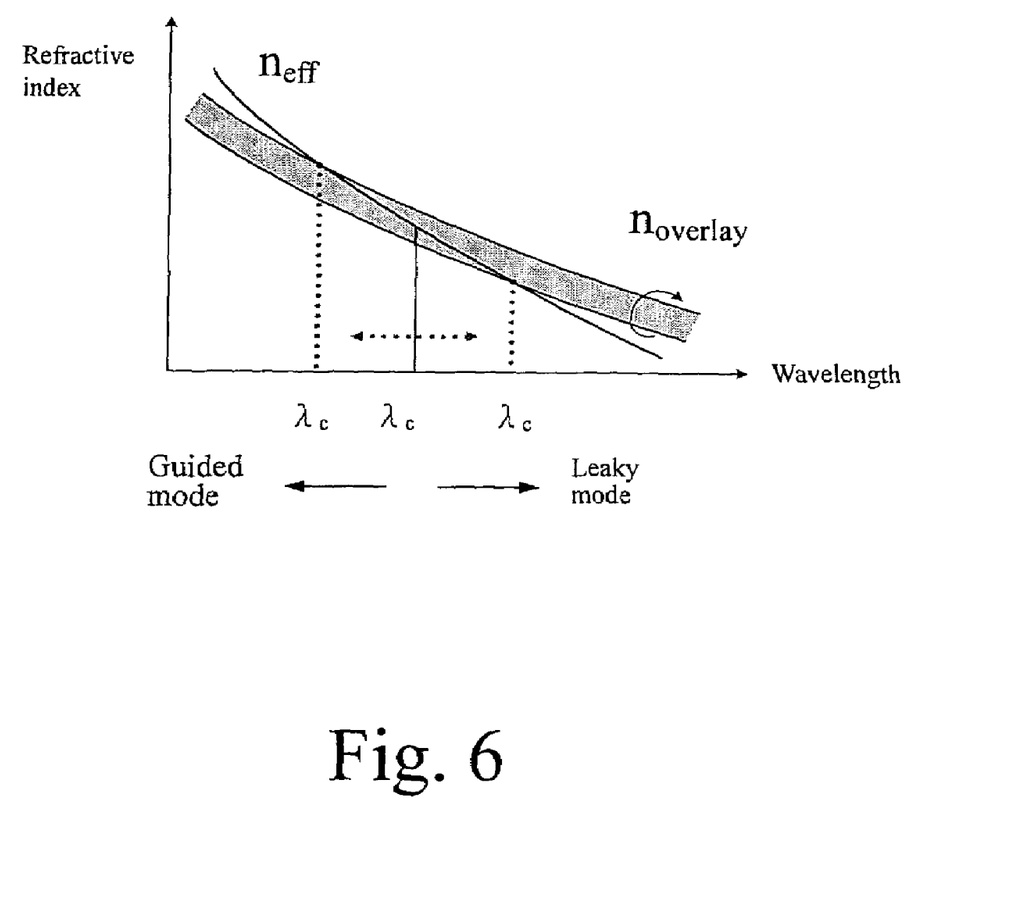
FIG. 6 is a schematic diagram showing the variation of the relationship between the cutoff and the refractive index of the overlay medium according to the first embodiment of the present invention, wherein the filter is a short-pass filter.

With different dispersive characteristics of different polymers 54, the refractive index of the polymers 54 is changeable while applying a heat source or an electric field thereon, so as to filter an input light 57 propagating in the core 51 by a dispersive evanescent wave tunneling while the input light 57 passes through the evanescent-field 53. As a result, the transmission of the long wavelength part of the light 57 is fundamental-mode cutoff. The output light 58 has a tunable filtered wavelength and hence a wide-band fiber-optic tunable filter is achieved, as shown in FIG. 6.

Figure 7:
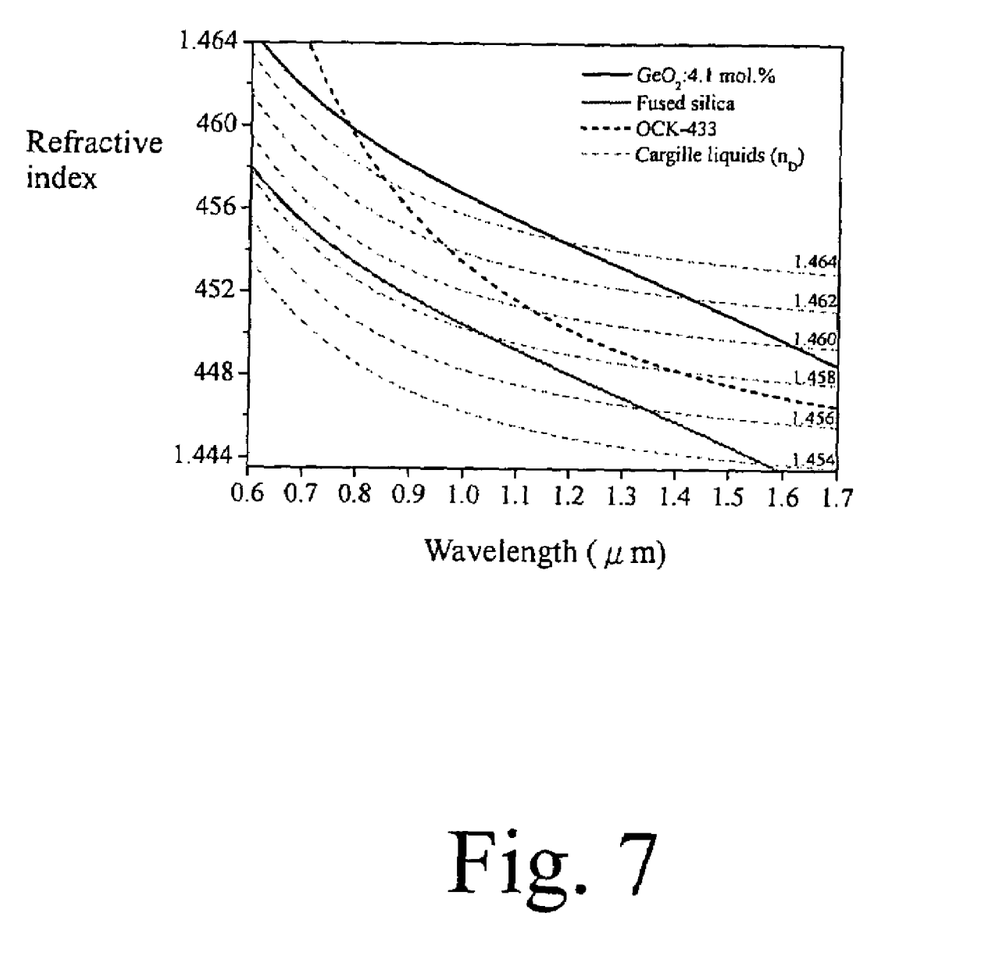
FIG. 7 is a diagram showing the respective refractive index dispersion curves of the dispersive materials, the Ge-doped silica and the fused silica according to a second embodiment of the present invention.

In FIG. 7, the refractive index dispersion curve of a CORNING SMF-28 fiber with CARGILLE index-matching liquids and the Cauchy's equation of Nye optical polymer OCK-433 are compared with each other. Based on the comparison, it is apparent that a fiber-optic short-pass filter is completed.

Figure 8:
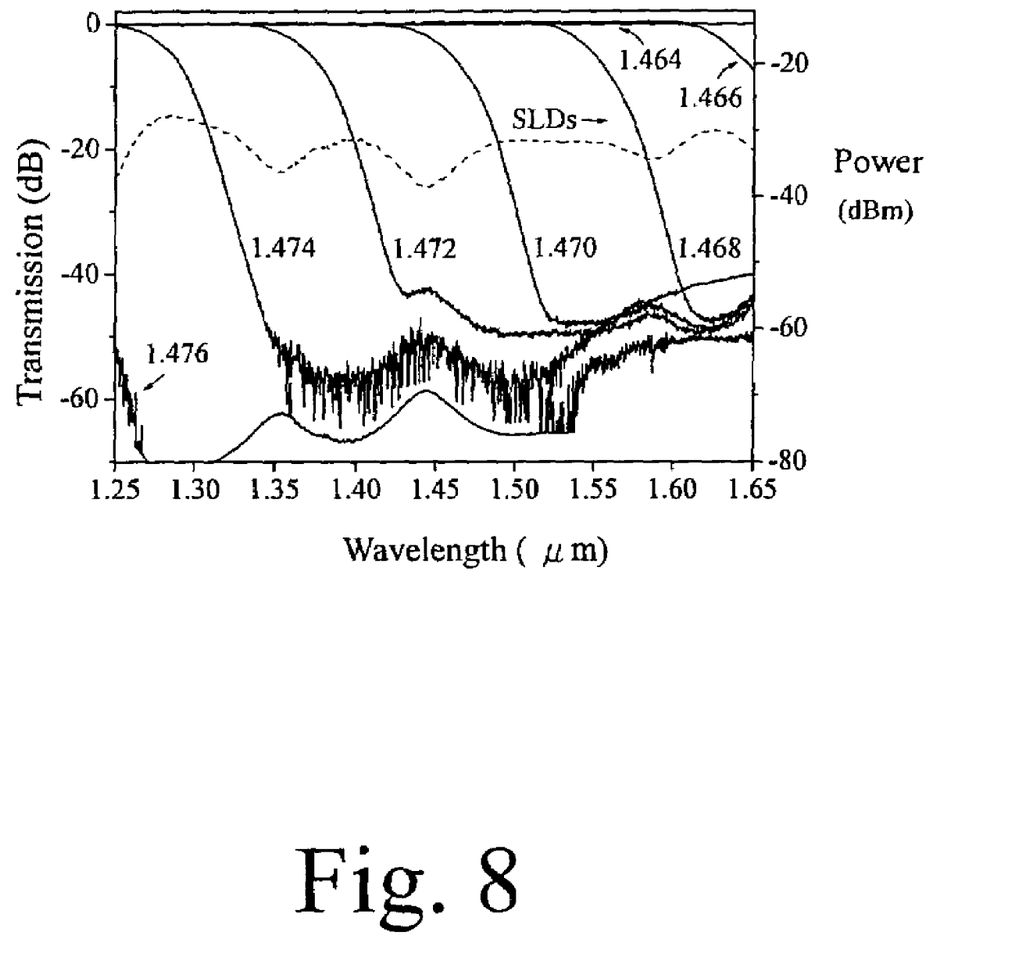
FIG. 8 is a diagram showing the wavelength response of a fiber-optic fiber according to a third embodiment of the present invention, wherein the filter is a side-polished high-boron-doping GF4A fiber.
Figure 9:
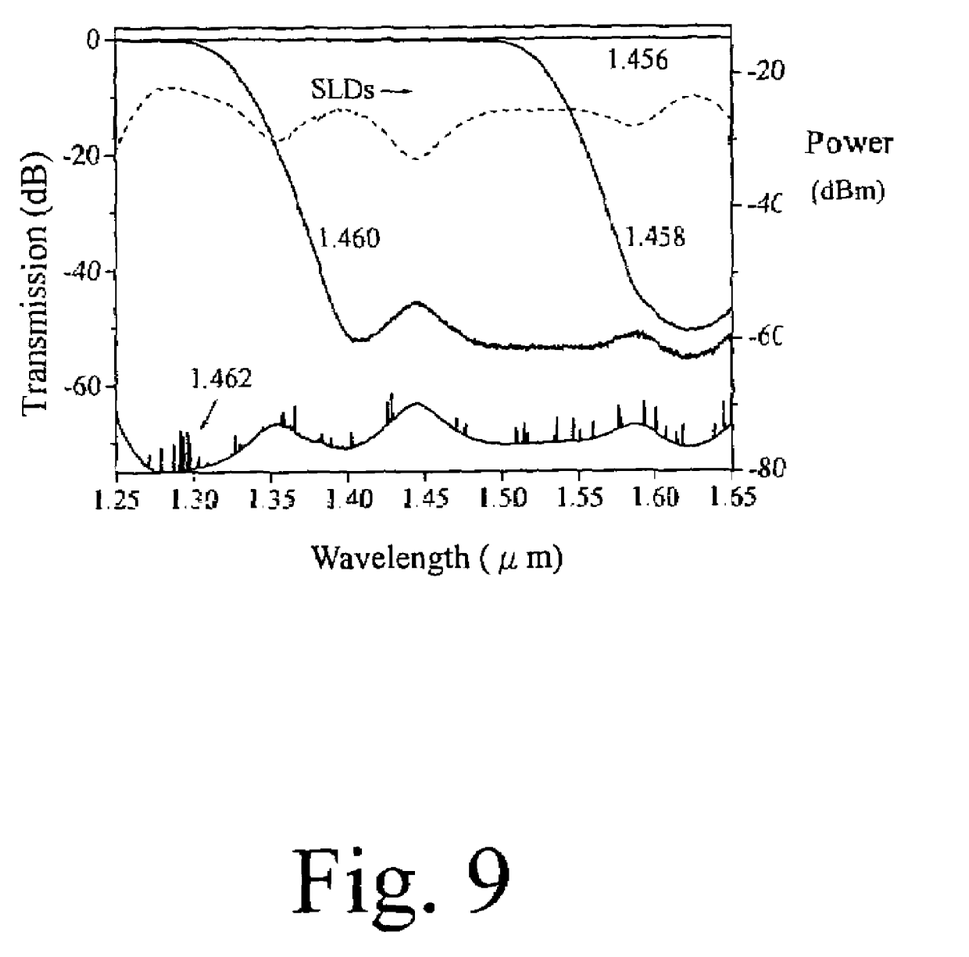
FIG. 9 is a diagram showing the wavelength response of a fiber-optic fiber according to a forth embodiment of the present invention, wherein the fiber is a side-polished SMF-28 fiber.

FIG. 8 and FIG. 9 respectively show the wavelength responses of a side-polishing GF4A fiber and an SMF-28 fiber which are both calibrated by CARGILLE index-matching liquids. GF4A has a higher concentration of Boron so the slope of the dispersive curve thereof is steeper. That is to say, the falling curves corresponding to a specific range (i.e. 0.002) of the refractive index of GF4A are narrower than those of SMF-28.

In FIG. 9, the interval between the respective falling curves of the refractive indices 1.458 and 1.460 is about 200 nm. Considering the resolution of the optical spectrum analyzer, the refractive index of an additional object is able to precisely calibrated to the extent of $10^{-5}$ This accuracy is suitable for the refractometer for liquids. As everyone knows, the refractive index of liquids is difficult to measure precisely.

Figure 10:
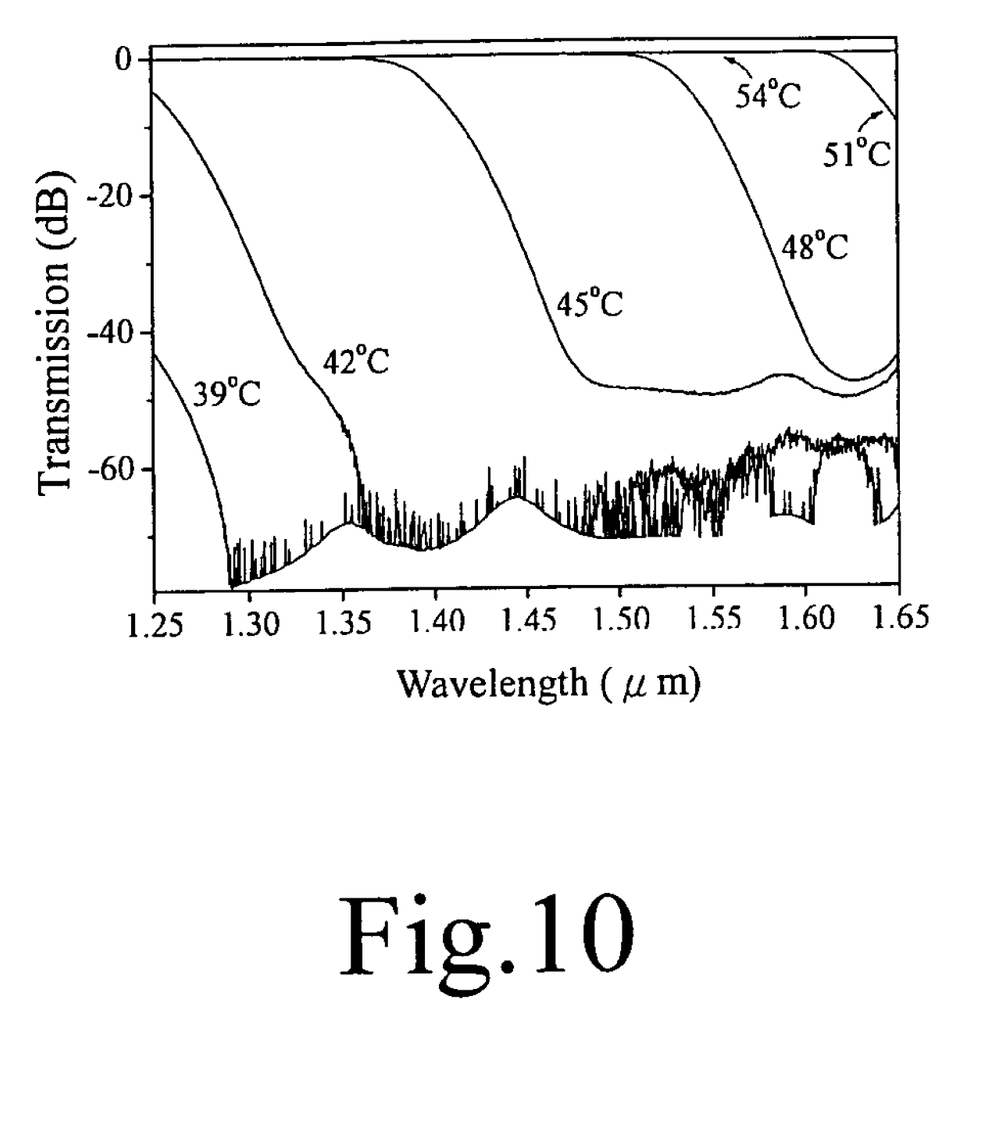
FIG. 10 is a diagram showing the wavelength response of a fiber-optic fiber according to a fifth embodiment of the present invention, wherein the fiber is a side-polished SMF-28 fiber after thermo-adjustment.

FIG. 10 is a diagram showing the wavelength response of a side-polished SMF-28 fiber after thermo-adjustment. In detailed, the wide-band fiber-optic tunable short-pass filter is obtained by applying OCK-433 on the side-polished SMF-28 fiber and heating them by the TE-cooler to change the refractive index of OCK-433. As shown in FIG. 10, the tuning range is nearly 400 nm (1250~1650 nm). It is also able to be utilized as a sensitive temperature sensor with an accuracy of 0.02° C.

In addition to the mentioned fiber-optic short-pass filter, the present invention also provides a fiber-optic long-pass filter, which is able to be fabricated by polymers with high dispersive characteristics. Similarly, a band-pass filter and a band-rejection filter are achievable by the present invention.

The wide-band fiber-optic tunable filter of the present invention is fabricated by positioning dispersive polymers on an evanescent-field surface of a fiber. The volume of the packed filter is about equal to the size of a steel cylinder, wherein the length thereof is 25 mm, and the diameter thereof is 2 mm. The wavelength tuning range is over 400 nm, which is wide enough for covering all bandwidth for the fiber-optic communication windows (1250~1650 nm). Such a fiber-optic filter is expensive and suitable for the fiber-to-the-home (FTTH) system networks, especially to the Tri-band (1310/1490/1550 nm) WDM-PON FTTH system which is popular in Japan. In this system, the wavelength 1310 is responsible for the transmission of speech data and the wavelengths 1490 and 1550 are responsible for the transmission of pure data and image data. When the data is uploaded to a network operation room or downloaded to a client's port, a tunable fiber-optic filter is needed before the light receiver for filtering the demanded specialized frequency band. To satisfy the use of Tri-band WDM-PON system, the tunable range of the filter must be at least covering the wavelength range of 1310~1550 nm. Moreover, the supervising wavelength 1625 nm in the network for network security and management must also be filtered before the optical receiver. In fact, the tuning range of the wide-band tunable filter must cover the wavelength range of 1310~1625 nm. The first choice for this wide range is traditional Fabry-Perot filter. However, the Fabry-Perot filter is extremely expensive for the FTTH network, while the present invention provides a wide-band fiber-optic tunable filter which is cheap and can easily satisfy the needs of the FTTH network. It is also suitable for the Tri-band WDM-PON FTTH project in Japan.

The advantages of the present invention are (1) low cost; (2) low optical loss; (3) wide tunable range; and (4) good band-rejection effect.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A fiber-optic tunable filter comprising:
    at least a fiber having a core and a cladding with an evanescent-field surface on one side thereof;
    a heating element and a temperature sensor arranged on another side of said cladding; and
    at least a dispersive material positioned on said evanescent-field surface and having a dispersive characteristic and a refractive index, wherein a light propagated in said core is leaky while passing through said evanescent-field surface according to a relationship between said dispersive characteristic and a change of said refractive index.

2. The fiber-optic tunable filter as claimed in claim 1 being a band-pass filter.

3. The fiber-optic tunable filter as claimed in claim 2, wherein said band-pass filter comprises a short-wavelength-pass filter and a long-wavelength-pass filter.

4. The fiber-optic tunable filter as claimed in claim 1 being a band-rejection filter.

5. The fiber-optic tunable filter as claimed in claim 1 being a short-wavelength-pass filter.

6. The fiber-optic tunable filter as claimed in claim 1 being a long-wavelength-pass filter.

7. The fiber-optic tunable filter as claimed in claim 1, wherein said evanescent-field surface is fabricated by a polishing method.

8. The fiber-optic tunable filter as claimed in claim 1, wherein said evanescent-field surface is fabricated by a laser ablation method.

9. The fiber-optic tunable filter as claimed in claim 1, wherein said evanescent-field surface is fabricated by a heating and stretching method.

10. The fiber-optic tunable filter as claimed in claim 9, wherein said heating and stretching method is performed by a heat source being one selected from a group consisting of a fire, a heating wire, an electromagnetic wave and an electric arc.

11. The fiber-optic tunable filter as claimed in claim 1, comprising a substrate with a groove having said evanescent-field surface therein.

12. The fiber-optic tunable filter as claimed in claim 1, wherein said substrate is one of a silicon substrate and a quartz substrate.

13. The fiber-optic tunable filter as claimed in claim 1, wherein said heating element is one selected from a group consisting of a TE cooler, a heating wire and a superconductive heating material.

14. The fiber-optic tunable filter as claimed in claim 1, wherein said change of said refractive index is achieved by being applied with one of a heat source and an electric field.

15. The fiber-optic tunable filter as claimed in claim 1, wherein said dispersive material is an optical polymer.

16. The fiber-optic tunable filter as claimed in claim 1, wherein said dispersive material is interlaced multi-layer made of different dispersive materials.

17. The fiber-optic tunable filter as claimed in claim 1, wherein said dispersive material has a birefringence property.

18. The fiber-optic tunable filter as claimed in claim 1, wherein said dispersive material has a photonic crystal band-gap structure.

19. The fiber-optic tunable filter as claimed in claim 1, wherein said fiber is a micro-structure fiber.

* * * * *